US006974627B2

(12) United States Patent
Morita et al.

(10) Patent No.: US 6,974,627 B2
(45) Date of Patent: Dec. 13, 2005

(54) FINE CARBON FIBER MIXTURE AND COMPOSITION THEREOF

(75) Inventors: Toshio Morita, Kawasaki (JP); Ryuji Yamamoto, Kawasaki (JP); Hitoshi Inoue, Kawasaki (JP); Satoshi Ohshima, Tsukuba (JP); Motoo Yumura, Tsukuba (JP)

(73) Assignees: Showa Denko K.K., Tokyo (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/489,664

(22) PCT Filed: Sep. 17, 2002

(86) PCT No.: PCT/JP02/09521

§ 371 (c)(1),
(2), (4) Date: Mar. 16, 2004

(87) PCT Pub. No.: WO03/027368

PCT Pub. Date: Apr. 3, 2003

(65) Prior Publication Data

US 2004/0241439 A1 Dec. 2, 2004

Related U.S. Application Data

(60) Provisional application No. 60/392,428, filed on Jul. 1, 2002.

(30) Foreign Application Priority Data

Sep. 20, 2001 (JP) .......................................... 2001-328391

(51) Int. Cl.⁷ .............................. D01F 9/12; D02G 3/00; B32B 9/00
(52) U.S. Cl. ......................... 428/367; 428/398; 428/408; 423/447.1
(58) Field of Search ................................ 428/367, 375, 428/408, 398; 423/447.1

(56) References Cited

U.S. PATENT DOCUMENTS

| 4,663,230 | A | | 5/1987 | Tennent | |
|---|---|---|---|---|---|
| 6,489,025 | B2 | * | 12/2002 | Morita et al. | 428/367 |
| 6,565,971 | B2 | * | 5/2003 | Morita et al. | 428/367 |
| 6,699,584 | B2 | * | 3/2004 | Taniguchi et al. | 428/402 |
| 6,844,061 | B2 | * | 1/2005 | Morita et al. | 428/367 |

FOREIGN PATENT DOCUMENTS

| EP | 0136497 A2 | 4/1985 |
|---|---|---|
| JP | 60-27700 A | 2/1985 |
| JP | 60-54998 A | 3/1985 |
| JP | 61-70014 A | 4/1986 |
| JP | 3-64606 B | 10/1991 |
| JP | 2778434 | 5/1998 |
| WO | WO 8603455 A1 | 6/1986 |

OTHER PUBLICATIONS

Ting J–M et al: "Formation of nodulated vapor grown carbon fiber" Carbon, Elsevier Science Publishing, New York, NY, US, vol. 38, No. 14, 2000, pp. 1917–1923, XP004211937 ISSN: 008–6223 p. 1919–p. 1923.

* cited by examiner

*Primary Examiner*—N. Edwards
(74) *Attorney, Agent, or Firm*—Sughrue Mion, PLLC (57) ABSTRACT

A fine carbon fiber mixture produced through a vapor-growth process, which comprises fine carbon fiber, each fiber filament of the fiber having an outer diameter of 1 to 500 nm and an aspect ratio of 10 to 15,000 and comprising a hollow space extending along its center axis and a multi-layer sheath structure consisting of a plurality of carbon layers; and non-fibrous carbon such as flake-like carbon, granular carbon, or sheet-like carbon. A composition comprising a resin or a rubber and a fine carbon fiber mixture as above contained therein. An electrically conductive article or a sliding article comprising the composition.

18 Claims, 7 Drawing Sheets

FINE CARBON FIBER MIXTURE AND COMPOSITION THEREOF

CROSS REFERENCE TO RELATED APPLICATION

This application is an application filed under 35 U.S.C. §111(a) claiming benefit pursuant to 35 U.S.C. §119(e)(0.1) of the filing date of the Provisional Application No. 60/392,428 filed on Jul. 1, 2002, pursuant to 35 U.S.C. §111(b).

FIELD OF THE INVENTION

The present invention relates to a fine carbon fiber mixture containing non-fibrous carbon, such as flake-like carbon, granular carbon, or sheet-like carbon; and more particularly to fine carbon fiber exhibiting excellent electrical conductivity, thermal conductivity, and tribological characteristics, and to a resin or rubber composition containing the fine carbon fiber.

BACKGROUND ART

Carbon fiber is used in a variety of composite materials, by virtue of its excellent properties such as high strength, high elastic modulus, and high electrical conductivity. Since carbon fiber serving as a carbon material exhibits excellent mechanical properties in addition to electrical conductivity, carbon fiber has been utilized in a variety of fields. In recent years, in conjunction with developments in electronic techniques, carbon fiber has been considered a promising filler in conductive resin for producing electromagnetic wave shielding material or antistatic material, and has been viewed as a useful filler for electrostatic coating which can be incorporated into the resin. Also, by virtue of its chemical stability, thermal stability, and fine structure, carbon fiber has been considered a promising field emission material for use in, for example, flat displays. In addition, carbon fiber has been considered a promising wear-resistant, electrically conductive material for use in, for example, electric brushes and variable resistors.

Conventional carbon fiber; i.e., organic carbon fiber, is produced by subjecting organic fiber, such as PAN-, pitch-, or cellulose-based fiber, to heat treatment and carbonization. When such carbon fiber is used as a filler in fiber reinforced composite material, in order to increase the contact area between the carbon fiber and the matrix of the material, desirably, the diameter of the fiber is reduced or the length thereof is increased. As a result, the reinforcement effect on the composite material is enhanced. In order to improve adhesion between the carbon fiber and the matrix, the carbon fiber desirably has a rough surface rather than a smooth surface. Therefore, the carbon fiber is subjected to surface treatment; for example, the carbon fiber is oxidized by exposure to air at high temperature, or the surface of the fiber is subjected to coating.

However, conventionally, carbon fiber having a small diameter has been impossible to produce, since its raw material; i.e., organic fiber filaments, has a diameter of about 5 to about 10 µm. Furthermore, a limitation is imposed on the ratio of length to diameter (i.e., aspect ratio) of conventional carbon fiber. Therefore, keen demand has arisen for development of carbon fiber of small diameter and high aspect ratio.

When carbon fiber is incorporated into resin used for producing an automobile body, or into resin or rubber for producing an electronic device, the carbon fiber must exhibit electrical conductivity comparable to that of metal. Therefore, in order to meet requirements for a variety of electrical conductive paints and electrical conductive resins, carbon fiber serving as a filler material has been required to exhibit improved electrical conductivity.

In order to improve electrical conductivity, carbon fiber must be subjected to graphitization. Therefore, in general, carbon fiber is subjected to graphitization at high temperature. However, even when carbon fiber is subjected to such graphitization, the carbon fiber fails to attain electrical conductivity comparable to that of metal. Therefore, when the carbon fiber is employed in the aforementioned material, in order to compensate for low electrical conductivity of the carbon fiber, a large amount of the carbon fiber must be incorporated into the material. As a result, workability and mechanical properties of the material are impaired. In view of the foregoing, demand has arisen for further improvements to the electrical conductivity of carbon fiber, and enhancement of the strength of the carbon fiber by reducing its diameter.

In the late 1980's, studies were conducted on vapor grown carbon fiber (hereinafter abbreviated as "VGCF") produced through a process which differs from that used for producing the aforementioned organic carbon fiber.

VGCF is known to be produced through thermal decomposition of a gas of, for example, hydrocarbon in a vapor phase in the presence of an organo-transition metallic catalyst. Through this process, carbon fiber having a diameter of hundreds of nm to 1 µm can be produced.

A variety of processes for producing VGCF are disclosed, including a process in which an organic compound such as benzene, serving as a raw material, and an organo-transition metallic compound such as ferrocene, serving as a metallic catalyst, are introduced into a high-temperature reaction furnace together with a carrier gas, to thereby produce VGCF on a substrate (Japanese Patent Application Laid-Open (kokai) No. 60-27700); a process in which VGCF is produced in a dispersed state (Japanese Patent Application Laid-Open (kokai) No. 60-54998); and a process in which VGCF is grown on a reaction furnace wall (Japanese Patent No. 2778434).

The aforementioned processes can produce carbon fiber of relatively small diameter and high aspect ratio which exhibits excellent electrical conductivity and is suitable as a filler material. Therefore, carbon fiber having a diameter of about 100 to about 200 nm and an aspect ratio of about 10 to about 500 is mass-produced, and is used, for example, as an electrically conductive filler material in resin or as an additive in lead storage batteries.

A characteristic feature of a VGCF filament resides in its shape and crystal structure. A VGCF filament has a cylindrical structure including a very small hollow space in its center portion, and a plurality of carbon hexagonal network layers grown around the hollow space so as to form concentric rings.

Iijima, et al. have discovered a multi-layer carbon nano-tube, which is a type of carbon fiber having a diameter smaller than that of VGCF, in soot produced by evaporating a carbon electrode through arc discharge in helium gas. The multi-layer carbon nano-tube has a diameter of 1 to 30 nm, and is a fine carbon fiber filament having a structure similar to that of a VGCF filament; i.e., the tube has a cylindrical structure including in its center portion a hollow space extending along the filament, and a plurality of carbon hexagonal network layers grown around the hollow space so as to form concentric rings.

However, the above process for producing the nano-tube through arc discharge has not yet been put into practice, since the process is not suitable for mass production.

Meanwhile, production of carbon fiber of high aspect ratio and exhibiting high electrical conductivity through the vapor-growth process is thought to be feasible, and therefore attempts have been made to improve the vapor-growth process for the production of carbon fiber of smaller diameter. For example, U.S. Pat. No. 4,663,230 and Japanese Patent Publication (kokoku) No. 3-64606 disclose a graphitic cylindrical carbon fibril having a diameter of about 3.5 to 70 nm and an aspect ratio of 100 or more. The carbon fibril has a structure in which a plurality of layers of regularly arranged carbon atoms are continuously disposed concentrically about the cylindrical axis of the fibril, and the C-axis of each of the layers is substantially perpendicular to the cylindrical axis. The entirety of the fibril includes no thermal carbon overcoat deposited through thermal decomposition, and has a smooth surface.

Japanese Patent Application Laid-Open (kokai) No. 61-70014 discloses carbon fiber having a diameter of 10 to 500 nm and an aspect ratio of 2 to 30,000, which fiber is produced through a vapor-growth process. According to this publication, a carbon layer obtained through thermal decomposition has a thickness of 20% or less the diameter of the carbon fiber.

When fine carbon fiber produced through the aforementioned vapor-growth process is employed as an electrically conductive material for producing electric products having sliding electrical contact points and involving friction or heat radiation, such as an electric brush and a variable resistor, demand has arisen for further improvements to tribological characteristics, electrical conductivity, and thermal conductivity of the carbon fiber.

An object of the present invention is to provide, on a mass-production scale, fine carbon fiber having a diameter of 500 nm or less and an aspect ratio of 10 to 15,000, and exhibiting excellent characteristics in terms of, for example, tribological characteristics, electrical conductivity, and thermal conductivity.

DISCLOSURE OF THE INVENTION

In order to achieve the aforementioned object, the present invention provides the following:

(1) A fine carbon fiber mixture produced through a vapor-growth process, which comprises fine carbon fiber, each fiber filament of the fiber having an outer diameter of 1 to 500 nm and an aspect ratio of 10 to 15,000 and comprising a hollow space extending along its center axis and a multi-layer sheath structure consisting of a plurality of carbon layers; and non-fibrous carbon such as flake-like carbon, granular carbon, or sheet-like carbon;

(2) The fine carbon fiber mixture according to (1), which comprises flake-like or sheet-like non-fibrous carbon;

(3) The fine carbon fiber mixture according to (1) or (2), wherein the granular carbon comprises a hollow space, or a metal or a metallic compound in its interior;

(4) The fine carbon fiber mixture according to (1) through (3), wherein the ratio by mass of the fine carbon fiber to the non-fibrous carbon is 10:90 to 95:5;

(5) The fine carbon fiber mixture according to (1) to (4), wherein the non-fibrous carbon has a size 0.1 to 500 times the diameter of the fine carbon fiber.

(6) The fine carbon fiber mixture according to (1) through (5), wherein the flake-like or sheet-like non-fibrous carbon has a thickness 0.01 to 0.5 times the diameter of the fine carbon fiber.

(7) The fine carbon fiber mixture according to (1) through (6), wherein the fine carbon fiber has branches.

(8) The fine carbon fiber mixture according to (1) through (7), wherein at least portion of the non-fibrous carbon is attached to the fine carbon fiber.

(9) A composition comprising a resin or a rubber and the fine carbon fiber mixture as recited in (1) through (8) contained therein.

(10) An electrically conductive article comprising the composition as recited in (9).

(11) A sliding article comprising the composition as recited in (9).

MODES FOR CARRYING OUT THE INVENTION

The present invention will next be described in detail.

In order to obtain fine carbon fiber, each fiber filament of the fiber having an outer diameter of 500 nm or less and exhibiting high electrical conductivity, the present inventors have performed extensive studies on production conditions for fine vapor-grown carbon fiber (VGCF), and have found that a fine carbon fiber mixture containing fine carbon fiber and non-fibrous carbon—such a mixture has not yet been known—is produced under specific production conditions, and that the fine carbon fiber mixture is a carbon fiber material exhibiting high electrical conductivity, excellent tribological characteristics, and excellent thermal conductivity. The fine carbon fiber mixture of the present invention is a carbon fiber mixture containing non-fibrous carbon which is produced during the course of production of fine vapor-grown carbon fiber (VGCF).

The fine carbon fiber mixture of the present invention will next be described.

Like the case of conventional fine carbon fiber, each fiber filament of the fine carbon fiber contained in the fine carbon fiber mixture of the present invention has a diameter of about 1 to about 500 nm, preferably 5 to 200 nm, and an aspect ratio of 10 to 15,000, preferably 10 to 10,000, and the fiber filament has a hollow space extending along its center axis and a multi-layer sheath structure consisting of a plurality of carbon layers, the layers forming concentric rings. The fine carbon fiber filament contained in the fine carbon fiber mixture of the present invention may have a nodular portion in the way of or at the end of the fiber filament. Furthermore, the fine carbon fiber may have branches.

A characteristic feature of the fine carbon fiber mixture of the present invention resides in that the mixture contains fine carbon fiber produced through a vapor-growth process and also contains non-fibrous carbon produced through the vapor-growth process simultaneous with production of the carbon fiber.

Conceivably, non-fibrous carbon is produced under certain production conditions in the course of production of fine carbon fiber through a vapor-growth process. For example, when the amount of a sulfur compound serving as a promoter is insufficient, and fine carbon fiber is grown insufficiently, non-fibrous carbon such as flake-like carbon, granular carbon, or sheet-like carbon is grown. The term "non-fibrous carbon" encompasses flake-like carbon, granular carbon, and sheet-like carbon. Such non-fibrous carbon has a size about 0.1 times to about 500 times the diameter of the simultaneously produced fine carbon fiber. Specifically, granular carbon assumes a relatively isotropic shape and has, in three-dimensional directions, a size about 0.1 to about 50 times the diameter of fine carbon fiber; sheet-like carbon is a thin substance and has, in two-dimensional directions, a size about 20 to about 500 times the diameter of fine carbon fiber; and flake-like carbon is a thin substance and has, in two-dimensional directions, a size about 1 to about 50 times the diameter of fine carbon fiber. The thickness of flake-like carbon or sheet-like carbon cannot be measured by use of a transmission electron microscope, but is considered to be about 0.01 to about 0.5 times the diameter of fine carbon fiber.

Since the non-fibrous carbon such as flake-like carbon, granular carbon, or sheet-like carbon is produced through a vapor-growth process, the entire surface of the non-fibrous carbon is covered with carbon layers in a relatively regular manner. The non-fibrous carbon has a crystal structure which is clearly different from that of a carbon fiber fragment having a fragmentation surface. The non-fibrous carbon such as flake-like carbon, granular carbon, or sheet-like carbon differs from the so-called carbon black in size and carbon crystal structure. Needless to say, the non-fibrous carbon differs from amorphous carbon.

The granular carbon may have a structure containing a cavity in its interior. The cavity of the granular carbon is considered a proof that the granular carbon (i.e., non-fibrous carbon) is produced through deformation of fine carbon fiber in the course of growth of the carbon fiber. In some cases, the non-fibrous carbon contains, in its cavity, amorphous carbon or a metallic compound (e.g., a metallic catalyst compound such as a carbide). Conceivably, due to the presence of such a catalyst substance, the non-fibrous carbon is generated during growth of fine carbon fiber; or the catalyst substance is embedded in the non-fibrous carbon as a result of formation of the non-fibrous carbon through abnormal growth of carbon. In some cases, the catalyst substance embedded in the non-fibrous carbon is gasified and vanishes in a firing step. However, conceivably, the catalyst substance which is completely embedded in the non-fibrous carbon fails to vanish, and tends to remain therein.

The sheet-like carbon is considered to be formed through deposition of carbon around nuclei on the surface of fine carbon fiber in a vapor phase, without involvement of a catalyst substance.

The aforementioned non-fibrous carbon such as flake-like carbon, granular carbon, or sheet-like carbon is produced while fine carbon fiber is produced through a vapor-growth process. In general, the fine carbon fiber and the non-fibrous carbon are present separately. However, depending on conditions during production or after production, at least a portion of the non-fibrous carbon may be deposited onto the fine carbon fiber.

The fine carbon fiber mixture of the present invention has not yet been produced through a conventional vapor-process for producing fine carbon fiber; i.e., the fine carbon fiber mixture is considered to be novel. Particularly, a vapor-grown fine carbon fiber mixture containing, in a predetermined amount or more, flake-like carbon or sheet-like carbon which is produced simultaneous with production of fine carbon fiber is novel.

Unlike conventional fine carbon fiber, the fine carbon fiber mixture of the present invention contains non-fibrous carbon. Therefore, as compared with fine carbon fiber produced through a vapor-growth process, the fine carbon mixture exhibits improved electrical conductivity, thermal conductivity, and tribological characteristics.

When the fine carbon fiber mixture of the present invention contains non-fibrous carbon in an amount of at least 5 mass %, preferably 5 to 95 mass %, more preferably 10 to 70 mass %, much more preferably 10 to 50 mass %, by virtue of the structural feature of non-fibrous carbon, the aforementioned effects are obtained more effectively.

Since each fiber filament of the fine carbon fiber contained in the fine carbon fiber mixture of the present invention is relatively long and has an outer diameter of 1 to 500 nm and an aspect ratio of 10 to 15,000, the carbon fiber mixture can be incorporated as a filler into a material in a large amount, and the carbon fiber mixture exhibits excellent reinforcement effect.

Next will be described preferred processes for producing the fine carbon fiber mixture of the present invention.

In general, the fine carbon fiber of the present invention can be produced through thermal decomposition of an organic compound, particularly a hydrocarbon, in the presence of a transition metal catalyst. Preferably, the resultant fine carbon fiber is subjected to heat treatment at 900 to 1,300° C., in order to remove tar, etc. deposited on the surface of the fiber. The resultant fine carbon fiber is typically graphitized through a further heat treatment at 2,000 to 3,500° C., preferably at 2,500 to 3,500° C.

That is, the fine carbon fiber can be produced through thermal decomposition of an organic compound, particularly a hydrocarbon, in the presence of a transition metal catalyst.

Examples of the organic compound which may serve as a raw material of the carbon fiber include organic compounds such as benzene, toluene, xylene, methanol, ethanol, naphthalene, phenanthrene, cyclopropane, cyclopentene, and cyclohexane; gasoline; kerosene; gasses such as CO, natural gas, methane, ethane, ethylene, acetylene, and butadiene; and mixtures thereof. Of these, aromatic compounds such as benzene, toluene, and xylene are particularly preferred.

An organo-transition metallic compound contains a transition metal serving as a catalyst, and is an organic compound containing, as a transition metal, a metal belonging to Group IVa, Va, VIa, VIIa, or VIII of the periodic table. An organo-transition metallic compound such as ferrocene or nickelocene is preferred. The organo-transition metallic compound serving as a catalyst is incorporated into an organic compound in an amount of 0.01 to 15 mass %, preferably 0.03 to 10 mass %, more preferably 0.1 to 5 mass %, on the basis of the carbon content of the organic compound.

The present inventors have found that, when the form of a reactor, a reaction system, reaction conditions, the types and amounts of an organic compound and an organo-transition metallic compound serving as a catalyst, and the type and amount of a promoter are appropriately determined and regulated, the fine carbon fiber of the present invention having a nodular portion can be produced.

In order to achieve the object of the present invention, preferably, an organic compound selected from among benzene, toluene, acetylene, ethylene, butadiene, and a mixture thereof is employed in combination with an organo-transition metallic compound selected from among nickelocene and ferrocene. More preferably, benzene and ferrocene are employed in combination.

In the present invention, a promoter is not limited to a sulfur compound. However, when a sulfur compound serving as a promoter is employed, and the amount of the sulfur compound employed is reduced as compared with the case of production of conventional carbon fiber, the fine carbon fiber mixture of the present invention can be produced in a particularly advantageous manner. No particular limitation is imposed on the type of a sulfur compound, so long as the sulfur compound can be dissolved in an organic compound serving as a carbon source. Examples of the sulfur compound which may be employed include thiophene, thiols, and inorganic sulfur. The amount of a sulfur compound as reduced to atomic sulfur is 3 to 10 mass %, preferably 4 to 10 mass %, more preferably 4 to 8 mass %, on the basis of the entirety of an organic compound (i.e., a carbon raw material such as hydrocarbon). When the amount of sulfur is smaller than 3 mass %, fine carbon fiber is grown fast, and non-fibrous carbon is hardly obtained. In contrast, when the amount of sulfur is larger than 10 mass %, fine carbon fiber is grown slowly, carbon fiber fails to be efficiently obtained in a sufficient amount.

Conventionally, it has not yet been known that a fine carbon fiber mixture having a specific composition can be produced when a reaction system, particularly, the types and amounts of an organic compound and an organo-transition metallic compound serving as a catalyst, and the type and amount of a promoter are appropriately determined and regulated. Also, utility of the novel fine carbon fiber mixture has not yet known. Therefore, the fine carbon fiber mixture having such a novel structure provided by the present invention is useful in industry.

A typical reducing gas such as hydrogen gas is employed as a carrier gas. Preferably, a carrier gas is heated to 500 to 1,300° C. in advance. The reason for the preliminary heating of a carrier gas is to generate a metal serving as a catalyst simultaneous with supply of a carbon source obtained through thermal decomposition of a carbon compound in the course of reaction, so as to allow reaction to proceed instantaneously, thereby producing finer carbon fiber. In the case where a carrier gas is mixed with a carbon compound serving as a raw material, when the temperature of the carrier gas is lower than 500° C., the raw material is not thermally decomposed easily. In contrast, when the temperature of the carrier gas exceeds 1,300° C., carbon fiber is grown in its radial direction, and the diameter of the fiber tends to become large.

The amount of a carrier gas to be employed is appropriately 1 to 70 parts by mol on the basis of 1.0 part by mol of an organic compound serving as a carbon source. The diameter of carbon fiber to be produced can be regulated by varying the ratio between the carbon source and the carrier gas.

The raw material of carbon fiber is prepared by dissolving an organo-transition metallic compound and a sulfur compound serving as a promoter in an organic compound serving as a carbon source. The raw material may be sprayed in the form of liquid into a reaction furnace by use of a carrier gas. Alternatively, the raw material may be gasified by use of a purge gas (i.e., a portion of a carrier gas), after which the thus-gasified raw material is fed to a reaction furnace to thereby allow reaction to proceed. In order to produce carbon fiber of small diameter, preferably, the raw material is gasified and then fed to a reaction furnace.

A vertical electric furnace is typically employed as a reaction furnace. The temperature of the reaction furnace is 800 to 1,300° C., preferably 1,000 to 1,300° C. A mixture of a raw material fluid and a carrier gas or a mixture of a gasified raw material and a carrier gas is fed to a reaction furnace heated to a predetermined temperature so as to allow reaction to proceed, thereby producing carbon fiber.

The raw material gas fed to the reaction furnace as described above is thermally decomposed, the organic compound serves as a carbon source, transition metal particles (i.e., a catalyst) are generated from the organo-transition metallic compound, and fine carbon fiber is grown around the transition metal particles serving as nuclei. During growth of the fine carbon fiber, under specific reaction conditions (particularly, under reaction conditions in which the amount of a sulfur compound is reduced), growth of the fine carbon fiber is partially impeded, and granular carbon or granules containing a metal catalyst are grown, to thereby produce the fine carbon fiber mixture of the present invention.

Preferably, the resultant fine carbon fiber mixture is subjected to heat treatment at 900 to 1,500° C. in an atmosphere of an inert gas such as helium or argon, and then further subjected to heat treatment at 2,000 to 3,500° C.; or alternatively, and still preferably, the mixture of as-grown fine carbon fiber is subjected to heat treatment at 2,000 to 3,500° C. in an inert gas atmosphere.

The mixture of as-grown fine carbon fiber, or the fine carbon fiber mixture which has undergone heat treatment at 900 to 1,500° C. in an inert gas atmosphere, may be mixed with a boron compound such as boron carbide ($B_4C$), boron oxide ($B_2O_3$), elemental boron, boric acid ($H_3BO_3$), or a borate, and then further subjected to heat treatment at 2,000 to 3,500° C. in an inert gas atmosphere. No particular limitation is imposed on the amount of a boron compound added to the fine carbon fiber mixture, since the amount varies in accordance with chemical properties and physical properties of the boron compound. For example, when boron carbide ($B_4C$) is employed, the amount of boron carbide is 0.05 to 10 mass %, preferably 0.1 to 8 mass %, more preferably 0.5 to 5 mass %, on the basis of the entirety of the fine carbon fiber mixture.

EXAMPLES

The present invention will next be described by way of Examples.

(Example)

Figure 1:
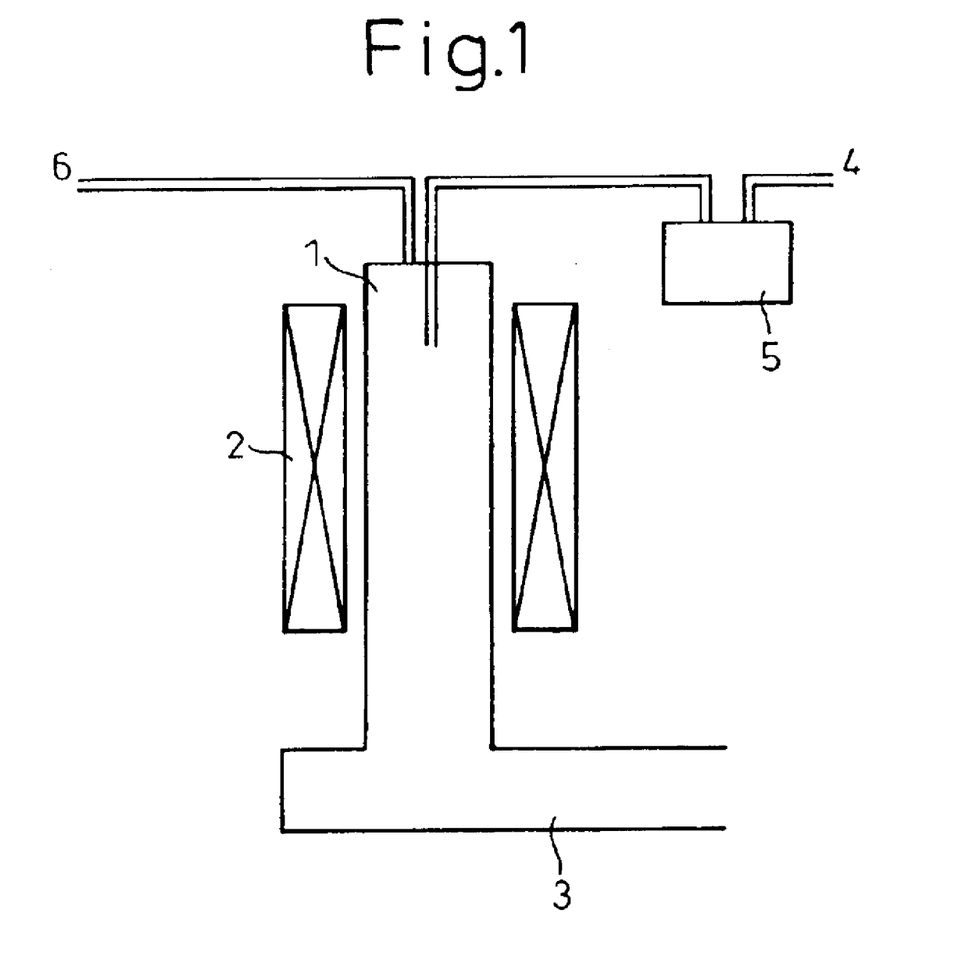
FIG. 1 is a schematic representation showing an apparatus for producing the fine carbon fiber of Example.

As schematically shown in FIG. 1, a raw material feed pipe 4 for feeding a raw material which had been gasified in a raw material gasification apparatus 5 and a carrier gas feed pipe 6 were provided on the top of a vertical heating furnace 1 (inner diameter: 170 mm, length: 1,500 mm).

Benzene containing ferrocene (4 mass %) and thiophene (5 mass % (1.9 mass % as reduced to atomic sulfur)) was gasified, the gasified product was fed through the raw material feed pipe 4 at a rate of 15 g/minute while the temperature of the product was maintained at 200° C., and hydrogen serving as a carrier gas was fed at a rate of 180 liters/minute, to thereby allow reaction to proceed.

Fine carbon fiber produced through the above reaction was subjected to heat treatment at 1,300° C. in an argon (Ar) atmosphere. The thus-treated fine carbon fiber was further subjected to heat treatment at 2,800° C. in an Ar atmosphere, to thereby produce a fine carbon fiber mixture (yield by mass through heat treatment: 90%).

FIGS. 2 through 5 show transmission electron micrographs of different portions of the thus-produced fine carbon fiber mixture. The fine carbon fiber contained in the carbon fiber mixture shown in each of FIGS. 2 through 5 has a hollow space extending along its center axis and a multi-layer sheath structure consisting of a plurality of carbon layers. The fine carbon fiber has an outer diameter of 5 to 200 nm and an aspect ratio of 2,000 or more.

Figure 2:
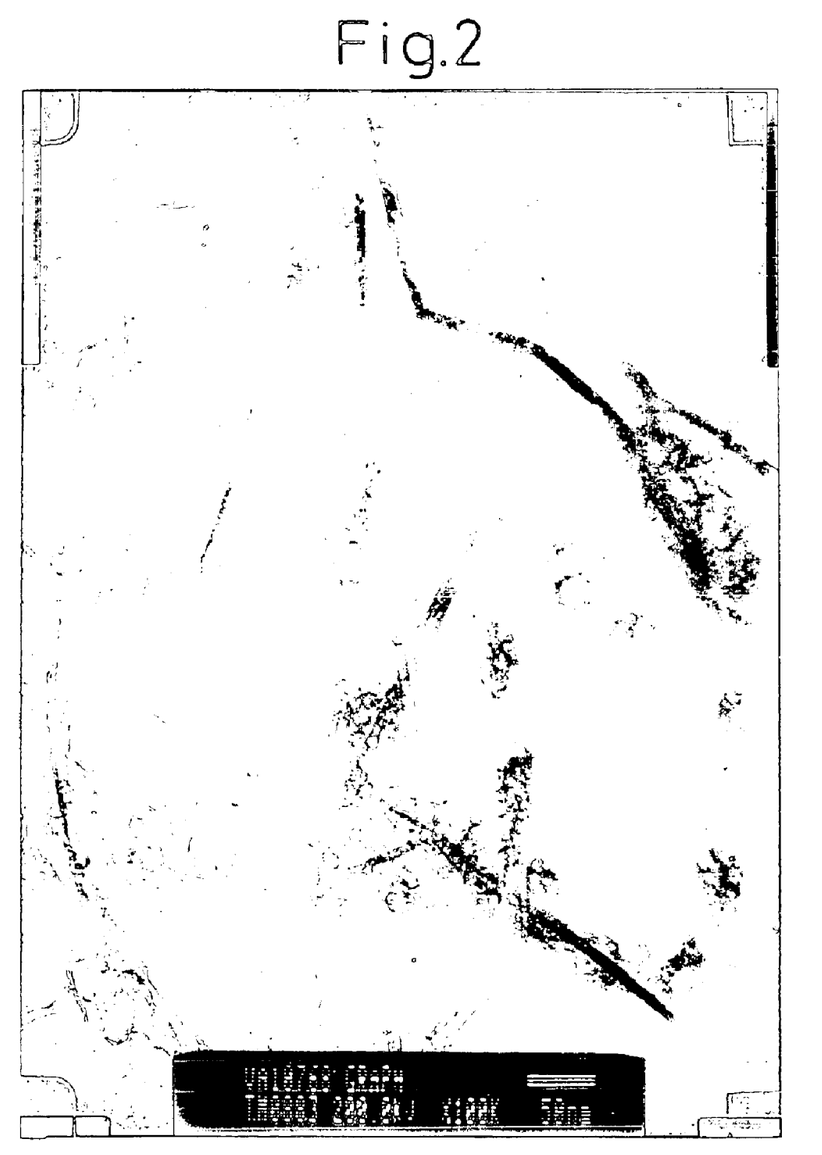
FIG. 2 shows a transmission electron micrograph of the fine carbon fiber of Example.

FIG. 2 shows carbon granules having a virtually round shape, along with fine carbon fiber filaments. Each of the fine carbon fiber filaments has a diameter of about 5 to about 20 nm, and each of the carbon granules has a size of about 5 to about 50 nm. The carbon granule has a cavity in its interior. Carbon granules adhere to one another, or are deposited onto the surface of fine carbon fiber filaments.

Figure 3:
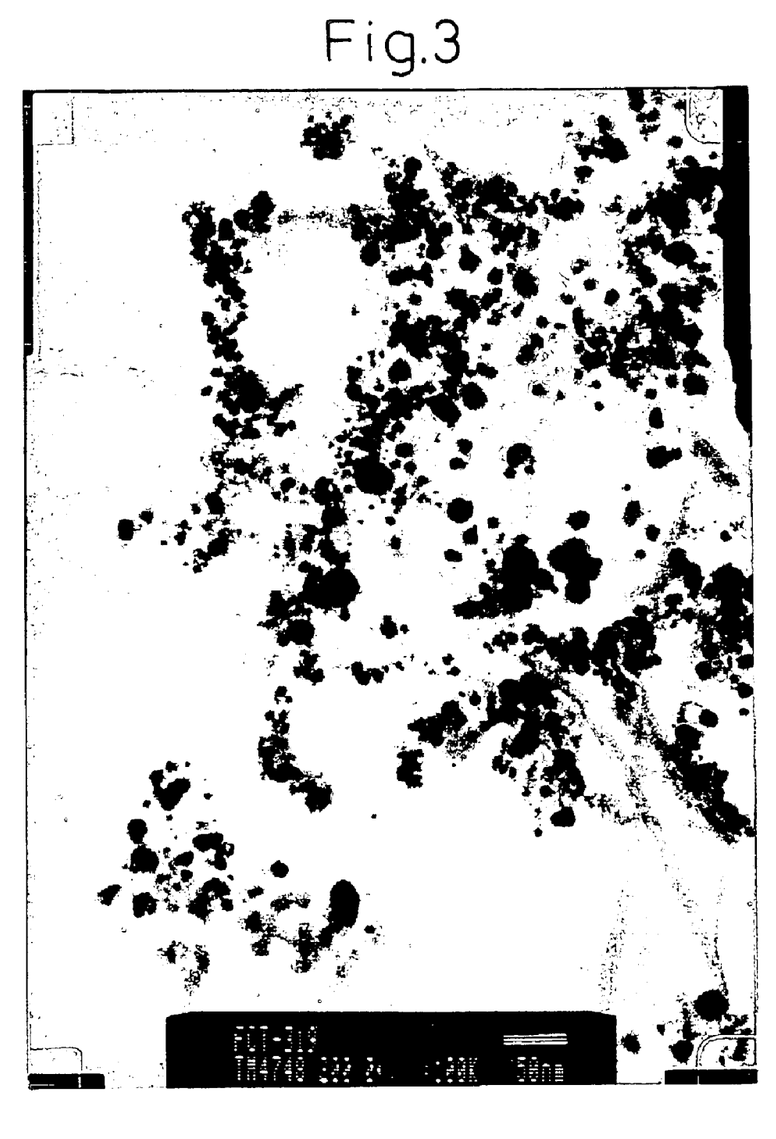
FIG. 3 shows a transmission electron micrograph of the fine carbon fiber of Example.

FIG. 3 shows carbon granules as in the case of FIG. 2. Carbon granules shown in FIG. 3 contain a metal or a metallic compound in their interiors.

Figure 4:
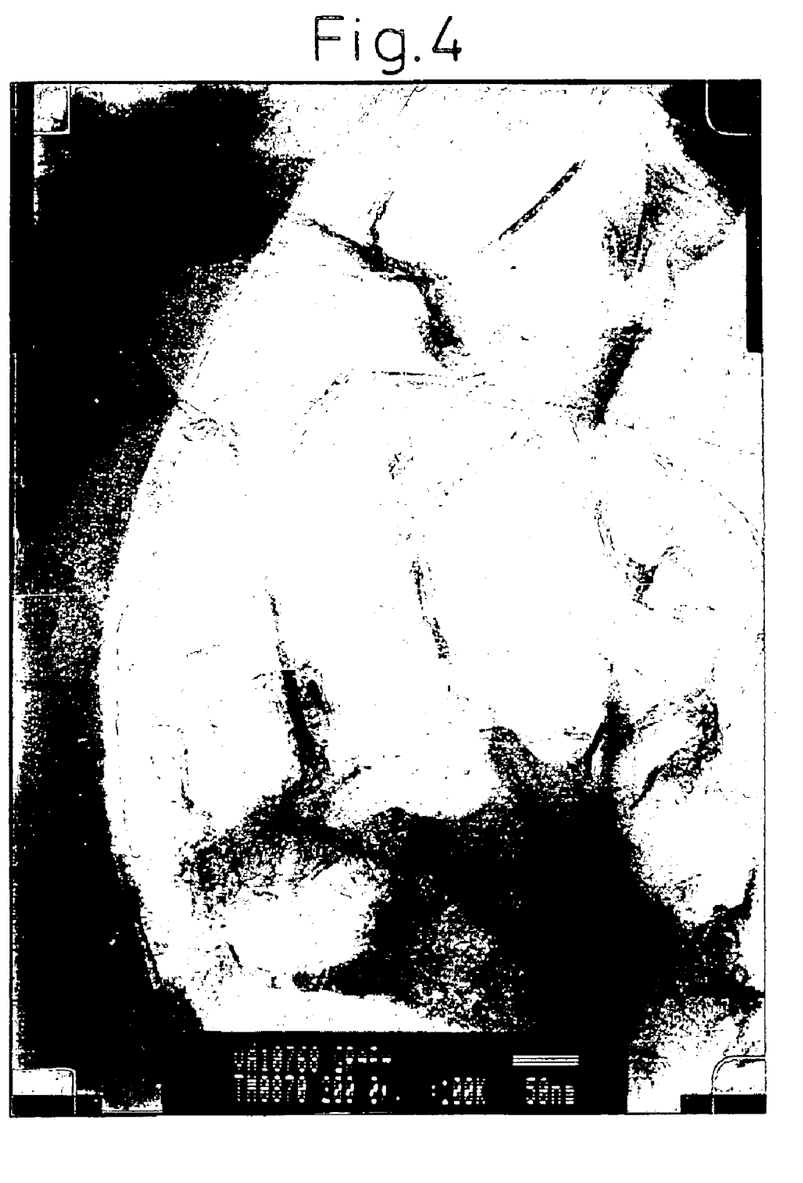
FIG. 4 shows a transmission electron micrograph of the fine carbon fiber of Example.

As shown in FIG. 4, carbon sheets (carbon films) are present between fine carbon fiber filaments. Each of the carbon sheets has dimensions of about 100 nm× about 100 nm to about 10,000 nm× about 10,000 nm. These sheets are present between the fine carbon fiber filaments over a wide range. The thickness of each of the sheets is not clear. Although a thin carbon sheet is considered to have a thickness smaller than the diameter of the fine carbon fiber filament, a carbon sheet having a thickness larger than the diameter of the fiber filament may be present. Flake-like carbon has a developed carbon crystal structure, and has a multi-layer structure. Meanwhile, sheet-like carbon has an amorphous structure, and has an insufficiently developed carbon crystal structure.

Figure 5:
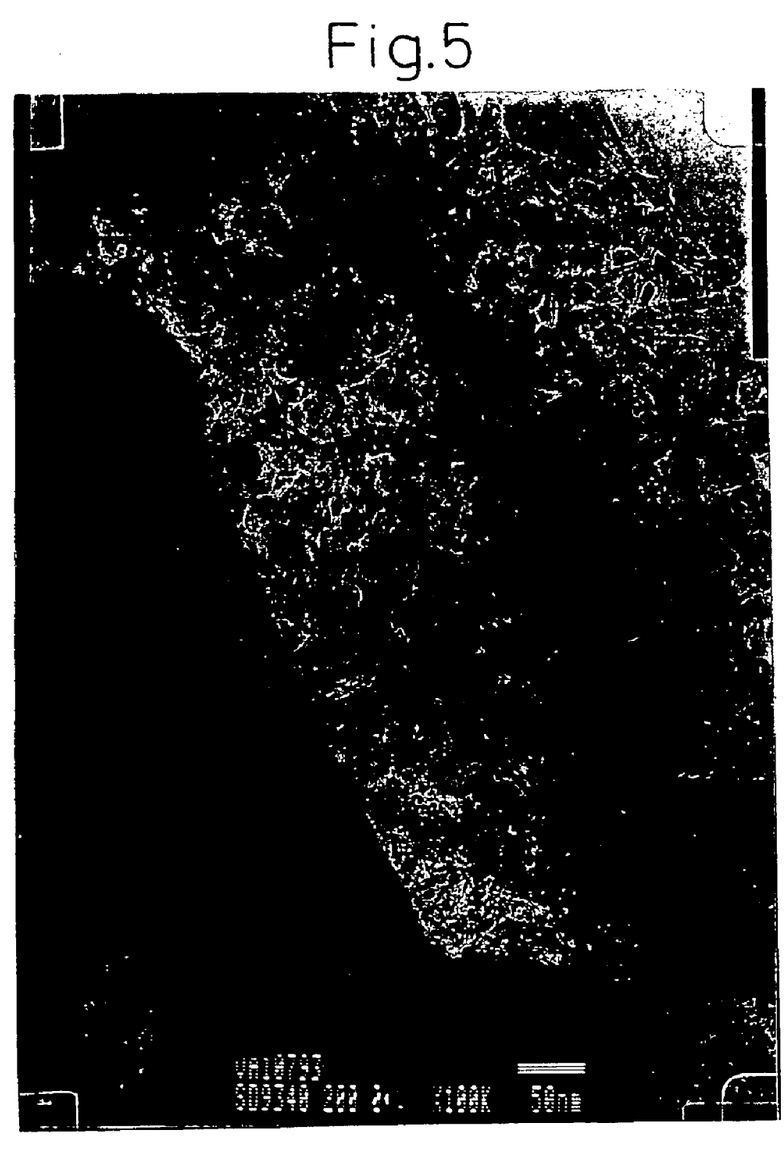
FIG. 5 shows a transmission electron micrograph of the fine carbon fiber of Example.
Figure 6:
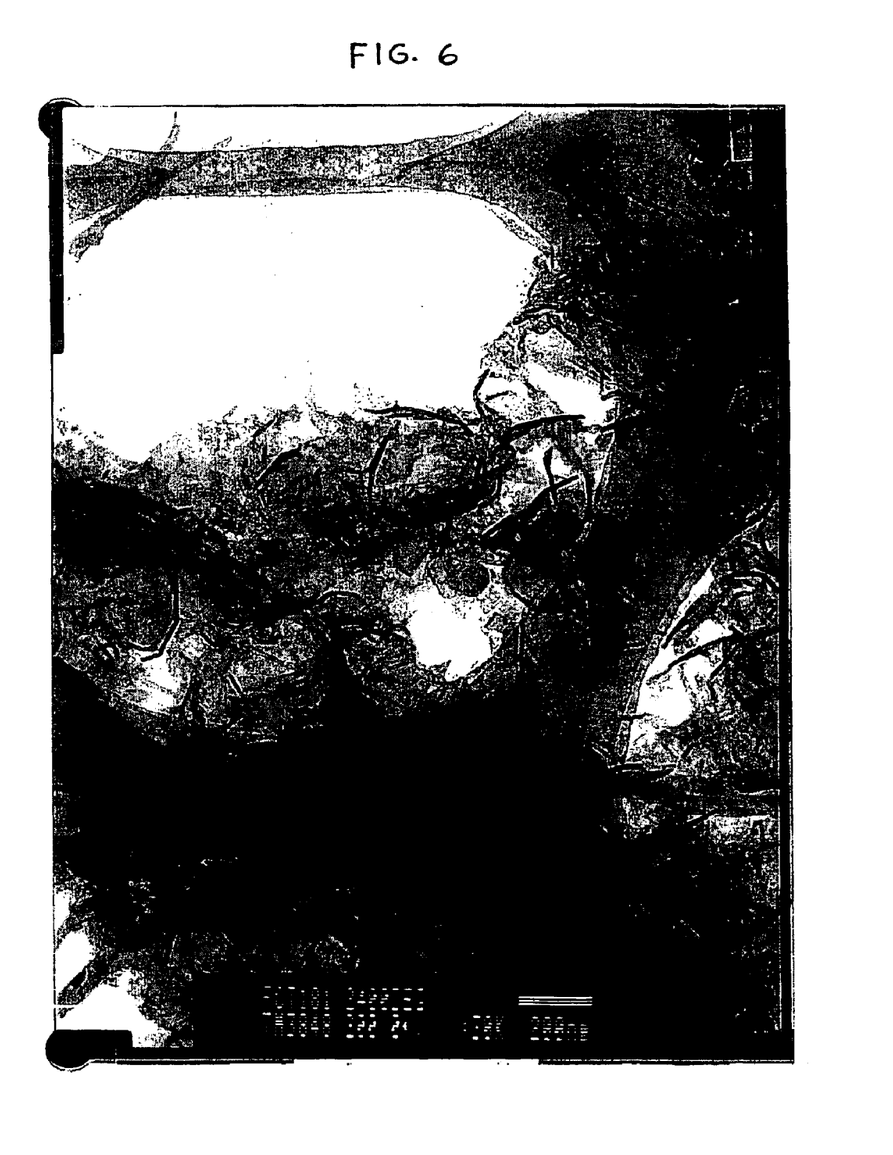
FIG. 6 shows a transmission election micrograph of a fine carbon fiber mixture containing flake carbon.
Figure 7:
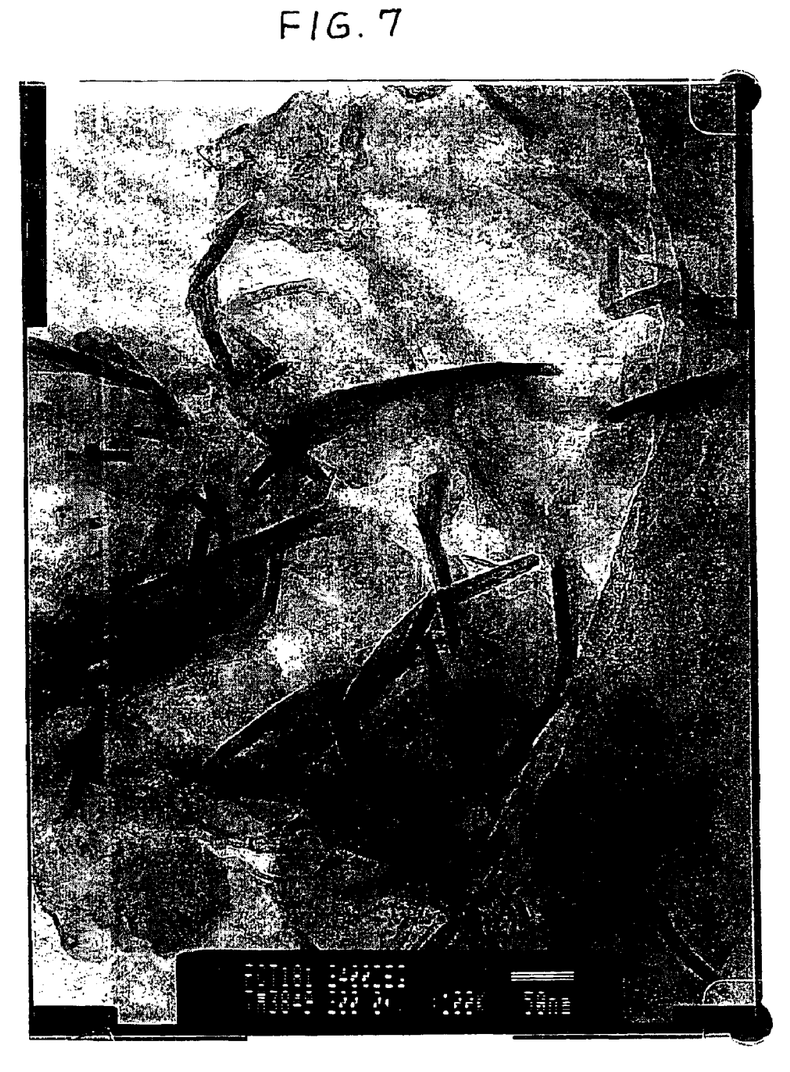
FIG. 7 shows an enlarged segment of the transmission election micrograph of FIG. 6.

FIG. 5 shows a transmission electron micrograph of fine carbon fiber which has undergone heat treatment at 1,300° C. As shown in FIG. 5, numerous carbon granules adhere to one another and form an aggregate.

(Comparative Example)

As schematically shown in FIG. 1, the raw material feed pipe 4 for feeding a raw material which had been gasified in the raw material gasification apparatus 5 and the carrier gas feed pipe 6 were provided on the top of the vertical heating furnace 1 (inner diameter: 170 mm, length: 1,500 mm).

Toluene containing ferrocene (4 mass %) and thiophene (0.5 mass % (0.4 mass % as reduced to atomic sulfur)) was gasified, the gasified product was fed through the raw material, feed pipe 4 at a rate of 15 g/minute while the temperature of the product was maintained at 200° C., and hydrogen serving as a carrier gas was fed at a rate of 180 liters/minute, to thereby allow reaction to proceed.

Fine carbon fiber produced through the above reaction was subjected to heat treatment at 1,300° C. in an argon (Ar) atmosphere. The thus-treated fine carbon fiber was further subjected to heat treatment at 2,800° C. in an Ar atmosphere, to thereby produce fine carbon fiber (yield by mass through heat treatment: 90%).

Observation under a transmission electron microscope revealed that the fine carbon fiber of Comparative Example has the same structure as that of the fine carbon fiber contained in the fine carbon fiber mixture of Example, except that the fine carbon fiber of Comparative Example has a uniform diameter and contains no non-fibrous carbon.

(Preparation of composite material)

A composite material was prepared from polyacetal and each of the fine carbon fibers of Example and Comparative Example, and the resultant composite material was subjected to measurement of friction coefficient in accordance with JIS-K-7125 and volume specific resistance in accordance with JIS-K-7194. The results are shown in Table 1.

TABLE 1

| Fine carbon fiber | Example 1 | Comparative Example 1 |
|---|---|---|
| Incorporation amount (mass %) | 15 | 15 |
| Friction coefficient (−) | 0.12 | 0.2 |
| Volume specific resistance ($\Omega \cdot cm$) | $10^0$ | $10^0$ |

As is clear from Table 1, when reaction conditions are selected appropriately, non-fibrous carbon is formed along with fine carbon fiber, and a composite material prepared from a resin and the resultant fine carbon fiber mixture exhibits excellent tribological characteristics.

INDUSTRIAL APPLICABILITY

According to the present invention, there can be provided a fine carbon fiber mixture containing non-fibrous carbon and fine carbon fiber, each fiber filament of the fiber having an outer diameter of 1 to 500 nm and an aspect ratio of 10 to 15,000, the fine carbon fiber differing from conventional carbon fiber or vapor grown carbon fiber. The fine carbon fiber mixture is useful as, for example, a filler material employed in electrically conductive material, thermally conductive material, electric sliding material, electric friction material, etc. and can be used for electric equipment parts, automobile parts, and machine parts.

What is claimed is:

1. A fine carbon fiber mixture produced through a vapor-growth process, which comprises fine carbon fiber, each fiber filament of the fiber having an outer diameter of 1 to 500 nm and an aspect ratio of 10 to 15,000 and comprising a hollow space extending along its center axis and a multi-layer sheath structure consisting of a plurality of carbon layers; and non-fibrous carbon exterior to the fine carbon fiber.

2. The fine carbon fiber mixture according to claim 1, wherein the non-fibrous carbon comprises flake carbon or sheet carbon.

3. The fine carbon fiber mixture according to claim 1 or 2, wherein the granular carbon comprises a hollow space, or a metal or a metallic compound in its interior.

4. The fine carbon fiber mixture according to any one of claims 1 to 3, wherein the ratio by mass of the fine carbon fiber to the non-fibrous carbon is 10:90 to 95:5.

5. The fine carbon fiber mixture according to any one of claims 1 to 4, wherein the non-fibrous carbon has a size 0.1 to 500 times the diameter of the fine carbon fiber.

6. The fine carbon fiber mixture according to claim 2, wherein the flake carbon or the sheet carbon has a thickness 0.01 to 0.5 times the diameter of the fine carbon fiber.

7. The fine carbon fiber mixture according to any one of claims 1 to 6, wherein the fine carbon fiber has branches.

8. The fine carbon fiber mixture according to any one of claims 1 to 7, wherein at least portion of the non-fibrous carbon is attached to the fine carbon fiber.

9. A composition comprising a resin or a rubber and the fine carbon fiber mixture as recited in any one of claims 1 to 8 contained therein.

10. An electrically conductive article comprising the composition as recited in claim 9.

11. A sliding article comprising the composition as recited in claim 9.

12. The fine carbon mixture according to claim 1, wherein the non-fibrous carbon is selected from the group consisting of flake carbon, granular carbon and sheet carbon.

13. The fine carbon fiber mixture according to claim 1, wherein the non-fibrous carbon comprises sheet carbon.

14. The fine carbon fiber mixture according to claim 13, wherein the ratio by mass of the fine carbon fiber to the non-fibrous carbon is 10:90 to 95:5.

15. The fine carbon fiber mixture according to claim 13, wherein the non-fibrous carbon has a size 1 to 50 times the diameter of the fine carbon fiber.

16. The fine carbon fiber mixture according to claim 13, wherein the sheet carbon has a thickness 0.01 to 0.5 times the diameter of the fine carbon fiber.

17. The fine carbon fiber mixture according to claim 13, wherein the fine carbon fiber has branches.

18. The fine carbon fiber mixture according to claim 13, wherein at least portion of the non-fibrous carbon is attached to the fine carbon fiber.

* * * * *